US012300838B2

(12) United States Patent
St. John et al.

(10) Patent No.: US 12,300,838 B2
(45) Date of Patent: May 13, 2025

(54) PATIENT SUPPORT APPARATUS WITH BATTERY RETENTION SYSTEM

(71) Applicant: Stryker Corporation, Kalamazoo, MI (US)

(72) Inventors: Connor F. St. John, Kalamazoo, MI (US); William D. Childs, Plainwell, MI (US)

(73) Assignee: Stryker Corporation, Portage, MI (US)

( * ) Notice: Subject to any disclaimer, the term of this patent is extended or adjusted under 35 U.S.C. 154(b) by 505 days.

(21) Appl. No.: 17/849,922

(22) Filed: Jun. 27, 2022

(65) Prior Publication Data

US 2023/0142871 A1 May 11, 2023

Related U.S. Application Data

(60) Provisional application No. 63/277,318, filed on Nov. 9, 2021.

(51) Int. Cl.
*H01M 50/244* (2021.01)
*A61G 7/05* (2006.01)
*H01M 50/249* (2021.01)
*H01M 50/262* (2021.01)

(52) U.S. Cl.
CPC ............ *H01M 50/244* (2021.01); *A61G 7/05* (2013.01); *H01M 50/249* (2021.01); *H01M 50/262* (2021.01)

(58) Field of Classification Search
USPC .............................................. 180/68.5; 5/616
See application file for complete search history.

(56) References Cited

U.S. PATENT DOCUMENTS

| | | | |
|---|---|---|---|
| 7,011,172 B2 | 3/2006 | Heimbrock et al. | |
| 10,276,844 B2 | 4/2019 | Wackwitz et al. | |
| 10,441,483 B2 | 10/2019 | Lambarth et al. | |
| 10,797,524 B2 | 10/2020 | Titov et al. | |
| 10,905,611 B2 | 2/2021 | Sidhu et al. | |
| 2001/0013437 A1* | 8/2001 | Husted | A61G 5/1089 180/68.5 |
| 2006/0055369 A1* | 3/2006 | Duesselberg | H01M 50/247 320/112 |
| 2007/0221423 A1* | 9/2007 | Chang | A61G 5/10 180/68.5 |
| 2008/0211248 A1* | 9/2008 | Lambarth | A61G 1/0567 296/20 |
| 2017/0172829 A1 | 6/2017 | Tessmer et al. | |
| 2019/0117487 A1 | 4/2019 | Hayes et al. | |
| 2019/0123597 A1 | 4/2019 | Patmore et al. | |

* cited by examiner

*Primary Examiner* — Gregg Cantelmo
(74) *Attorney, Agent, or Firm* — Howard & Howard Attorneys PLLC (57) ABSTRACT

A patient support apparatus and a removable battery usable with the patient support apparatus. The patient support apparatus may include a support frame with a patient support deck disposed on the support frame and a lift assembly having a powered lift actuator to adjust the support frame. The patient support apparatus may further include a battery retention system coupled to the support frame. The battery retention system may include a mount base and a battery receiver pivotably coupled to the mount base for movement between a locked state and an unlocked state for permitting removal of the battery from the battery retention system.

20 Claims, 10 Drawing Sheets

PATIENT SUPPORT APPARATUS WITH BATTERY RETENTION SYSTEM

CROSS-REFERENCE TO RELATED APPLICATIONS

The subject patent application claims priority to, and all the benefits of, U.S. Provisional Patent Application No. 63/277,318, filed on Nov. 9, 2021, the entire contents of which are incorporated by reference herein.

BACKGROUND

Patient support apparatuses, such as hospital beds, stretchers, cots, tables, wheelchairs, chairs, and the like are used to help caregivers facilitate care of patients in a health care setting. Conventional patient support apparatuses comprise a base, a support frame, a patient support deck operatively attached to the support frame. Certain patient support apparatuses may also include one or more powered devices, such as a powered lift assembly for lifting and lowering the support frame relative to the base.

Power for the powered actuators may be provided via an extension cord or tether plugged into a wall outlet, or by a removable battery carried by the patient support apparatus. During use, the patient support apparatus may occasionally be jostled, knocked, bumped, or otherwise subjected to forces that may cause the battery to undesirably become disconnected from the patient support apparatus. With certain types of battery configurations, however, latches which surely fasten the battery so as to prevent unintentional removal may also sometimes make it difficult for a caregiver to quickly and easily replace a discharged battery.

While conventional patient support apparatuses have generally performed well for their intended purpose, there remains a need in the art for a patient support apparatus that overcomes the disadvantages in the prior art.

SUMMARY

In one aspect a patient support apparatus having a removable battery is disclosed. The patient support apparatus may comprise a support frame with a patient support deck disposed on the support frame and a lift assembly having a powered lift actuator to adjust the support frame. The patient support apparatus may further comprise a battery retention system coupled to the support frame. The battery retention system may comprise a mount base and a battery receiver pivotably coupled to the mount base for movement between a locked state and an unlocked state. The battery receiver may define a channel configured for engaging the battery and an aperture in communication with the channel. The battery retention system may further comprise an electrical interface coupled to the battery receiver and configured for engaging the battery and a latch pawl interposed between the battery receiver and the mount base adjacent to the aperture. The latch pawl may be arranged for movement between a retracted position, in which the latch pawl is substantially outside the channel, and an extended position, in which the latch pawl is at least partially disposed in the channel. The latch pawl may be engaged with the mount base such that pivoting movement of the battery receiver from the locked state to the unlocked state moves the latch pawl from the extended position toward the retracted position for permitting removal of the battery from the battery retention system.

In another aspect a patient support apparatus is disclosed. The patient support apparatus may comprise a support frame with a patient support deck disposed on the support frame and a lift assembly having a powered lift actuator to adjust the support frame. The patient support apparatus may further comprise a battery configured for providing power to the lift assembly and a battery retention system coupled to the support frame. The battery retention system may comprise a mount base and a battery receiver pivotably coupled to the mount base for movement between a locked state and an unlocked state. The battery receiver may further define an aperture in communication with the channel. The battery retention system may further comprise an electrical interface coupled to the battery receiver and configured for engaging the battery and a latch pawl interposed between the battery receiver and the mount base adjacent to the aperture. The latch pawl may be arranged for movement between a retracted position, in which the latch pawl is substantially outside the channel, and an extended position, in which the latch pawl is at least partially disposed in the channel. The latch pawl may be engaged with the mount base such that pivoting movement of the battery receiver from the locked state to the unlocked state moves the latch pawl from the extended position toward the retracted position for permitting removal of the battery from the battery retention system.

Any of the above aspects can be combined in full or in part. Any features of the above aspects can be combined in full or in part. Any of the above implementations for any aspect can be combined with any other aspect. Any of the above implementations can be combined with any other implementation whether for the same aspect or a different aspect.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
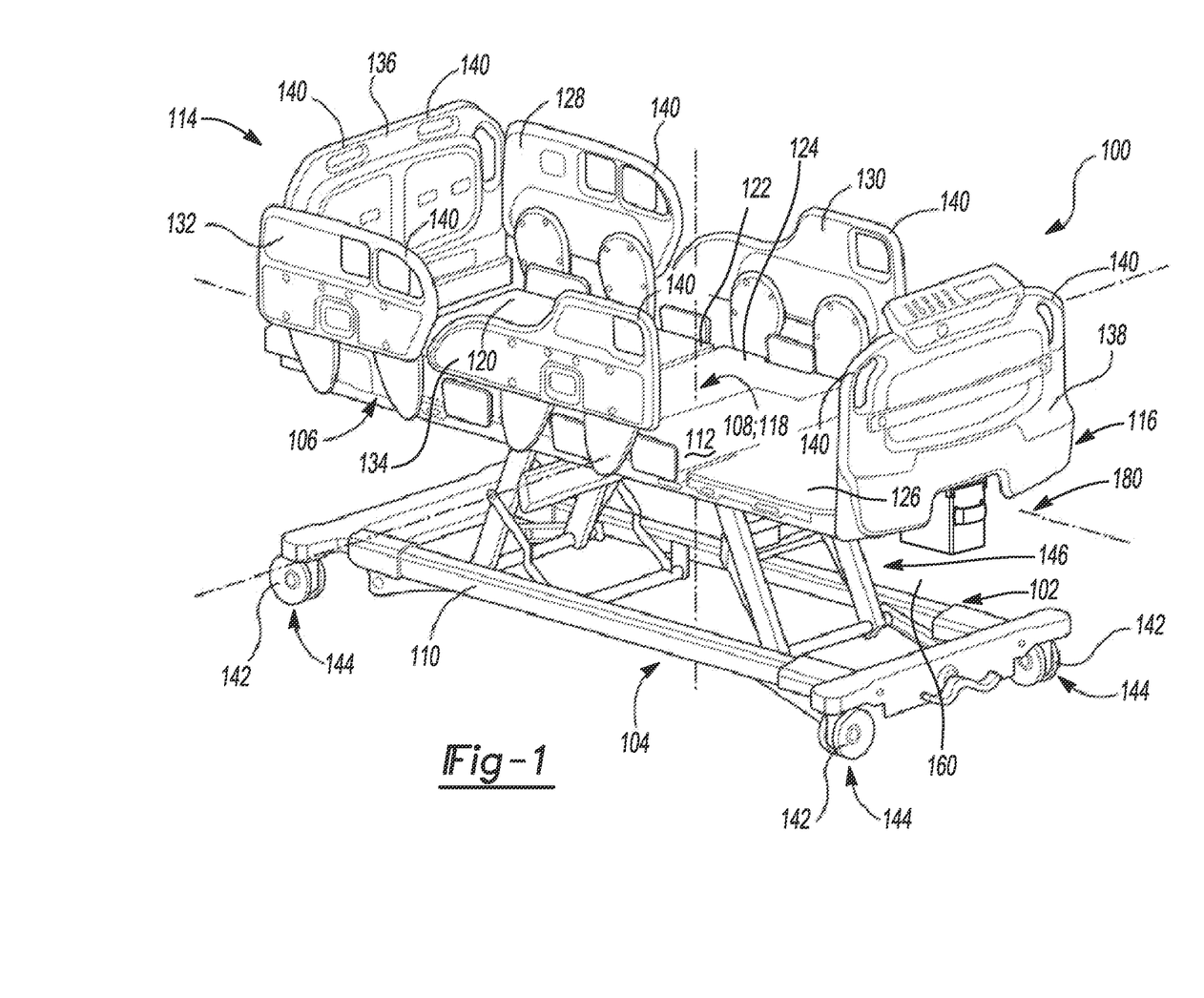
FIG. 1 is a perspective view of a patient support apparatus having a base, a support frame supporting a patient support surface, a lift assembly, and a battery retention system coupled to the support frame.

Referring to FIG. 1, an exemplary patient support apparatus 100 is shown for supporting a patient in a health care setting. The patient support apparatus 100 illustrated in FIG. 1 comprises a hospital bed. In other versions, however, the patient support apparatus 100 may comprise a stretcher, cot, table, wheelchair, or similar apparatus utilized in the care of a patient.

A support structure 102 provides support for the patient. The support structure 102 illustrated in FIG. 1 comprises a base 104 movable about a floor surface, a support frame 106, and a patient support deck 108. The base 104 may comprise a base frame 110. The patient support deck 108 may be disposed on the support frame 106. The support frame 106 and the patient support deck 108 are spaced above the base 104 in FIG. 1. The patient support deck 108 provides a patient support surface 112 upon which the patient is supported.

A mattress (not shown) may be disposed on the patient support deck 108 during use. The mattress comprises a secondary patient support surface upon which the patient is supported. The base 104, support frame 106, patient support deck 108, and patient support surfaces 112 each have a head-end 114 and a foot-end 116 corresponding to designated placement of the patient's head and feet on the patient support apparatus 100. The construction of the support structure 102 may take on any suitable design and is not limited to that specifically set forth above. In addition, the mattress may be omitted in certain versions, such that the patient rests directly on the patient support surface 112.

As will be discussed in greater detail below, the patient support deck 108 has at least one deck section 118 arranged for movement relative to the support frame 106 to support the patient in different positions, orientations, and the like. The deck sections 118 of the patient support deck 108 provide the patient support surface 112 upon which the patient is supported. More specifically, in the representative version of the patient support apparatus 100 illustrated in FIG. 1, the patient support deck 108 has four deck sections 118, which cooperate to define the patient support surface 112: a fowler section 120 (or back section), a seat section 122, a leg section 124, and a foot section 126. Here, the seat section 122 is fixed to the support frame 106 and is not arranged for movement relative thereto. However, it will be appreciated that the seat section 122 could be movable relative to other deck sections 118 in some versions. Conversely, the fowler section 120 and the leg section 124 are arranged for movement relative to each other and to the support frame 106, as described in greater detail below, and the foot section 126 is arranged to move partially concurrently with the leg section 124. Other configurations and arrangements are contemplated.

Side rails 128, 130, 132, 134 are coupled to the support frame 106 and are thereby supported by the base 1104. A first side rail 128 is positioned at a right head end of the support frame 106. A second side rail 130 is positioned at a right foot end of the support frame 106. A third side rail 132 is positioned at a left head end of the support frame 106. A fourth side rail 134 is positioned at a left foot end of the support frame 106. If the patient support apparatus 100 is a stretcher or a cot, there may be fewer side rails. The side rails 128, 130, 132, 134 are movable to a raised position in which they block ingress and egress into and out of the patient support apparatus 100, one or more intermediate positions, and a lowered position in which they are not an obstacle to such ingress and egress. In still other configurations, the patient support apparatus 100 may not include any side rails. The Applicant has described versions of patient support apparatuses having side rails equipped with actuators for "motorized" movement in United States Patent Application Publication No. US 2017/0172829 A1, the disclosure of which is hereby incorporated by reference in its entirety. Other configurations are contemplated.

The side rails 128, 130, 132, 134 could be of any suitable type, arrangement, or configuration sufficient to selectively limit patient ingress/egress from the patient support apparatus 100. It will be appreciated that there may be fewer side rails for certain versions, such as where the patient support apparatus 100 is realized as a stretcher or a cot. Moreover, it will be appreciated that in certain configurations, the patient support apparatus 100 may not include any side rails. Similarly, it will be appreciated that side rails may be attached to any suitable component or structure of the patient support apparatus 100. Furthermore, in certain versions the side rails are coupled to one of the deck sections 40 for concurrent movement.

A headboard 136 and a footboard 138 may be coupled to the support frame 106. In other versions, when the headboard 136 and footboard 138 are included, the headboard 136 and footboard 138 may be coupled to other locations on the patient support apparatus 100, such as the base 104. In still other versions, the patient support apparatus 100 may not include the headboard 136 and/or the footboard 138.

One or more grips 140 (or "handles") are shown in FIG. 1 as being integrated into the side rails 128, 130, 132, 134, the headboard 136, and the footboard 138. As is described in greater detail below, the grips 140 formed in the side rails 128, 130, 132, 134 are arranged to help facilitate patient egress from the patient support apparatus 100. It will be appreciated that the grips 140 formed in the side rails 128, 130, 132, 134, as well as the grips 140 formed in the headboard 136 and the footboard 138, can also be used by a caregiver to facilitate movement of the patient support apparatus 100 over floor surfaces. Additional grips 140 may be integrated into other components of the patient support apparatus 100, such as the support frame 106. The grips 140 are shaped so as to be grasped by the patient or the caregiver. It will be appreciated that the grips 140 could be integrated with or operatively attached to any suitable portion of the patient support apparatus 100 or may be omitted from certain parts of the patient support apparatus 100 in certain versions.

In addition to the headboard 136 the patient support apparatus may further comprise user input handles 152. The user input handles 152 are operable by the caregiver to control various functions of the patient support apparatus such as powered drive wheels, steering, braking, and the like. The user input handles 152 may further comprise buttons for selecting between different operation modes or other user configurable options that change operating parameters of the patient support apparatus 100.

Wheels 142 are coupled to the base 104 to facilitate transportation over floor surfaces. The wheels 142 are arranged in each of four quadrants of the base 104 adjacent to corners of the base 104. In the version shown in FIG. 1, the wheels 142 are caster wheels able to rotate and swivel relative to the support structure 102 during transport. Here, each of the wheels 142 forms part of a caster assembly 144 that is mounted to the base 104. It should be understood that various configurations of the caster assemblies 144 are contemplated. In addition, in some versions, the wheels 142 are not caster wheels and may be non-steerable, steerable, non-powered, powered, or combinations thereof. Additional wheels are also contemplated. For example, the patient support apparatus 100 may comprise four non-powered, non-steerable wheels, along with one or more powered wheels. In some cases, the patient support apparatus 100 may not include any wheels. In other versions, one or more auxiliary wheels (powered or non-powered), which are optionally movable between stowed positions and deployed positions, may be coupled to the support structure 102. In some cases, when auxiliary wheels are located between caster assemblies 144 and contact the floor surface in the deployed position, they cause two of the caster assemblies 144 to be lifted off the floor surface, thereby shortening a wheelbase of the patient support apparatus 100. A fifth wheel 154 may also be arranged substantially in a center of the base 104.

The patient support apparatus 100 further comprises a lift assembly, generally indicated at 146, which operates to raise and lower the support frame 106 relative to the base 104 which, in turn, moves the patient support deck 108 relative to the base 104 between a plurality of lift configurations, including a lowered lift configuration where the patient support deck 108 is positioned adjacent to the base 104, a raised lift configuration where the patient support deck 108 is elevated vertically above the base 104, or any desired vertical position therebetween. To this end, the lift assembly 146 may comprise powered lift actuators, such as a head-end lift actuator and a foot-end lift actuator, which are each operatively attached between the support frame 106 and the base 104 and arranged to facilitate movement of the patient support surface 112 with respect to the base 104.

The head-end and foot-end actuators may be realized as linear actuators, rotary actuators, or other types of actuators, and may be electrically, hydraulically, and/or pneumatically operated or combinations thereof. It is contemplated that, in some versions, different arrangements of actuators may be employed, such as with rotary actuators coupled to the base 104 and to the support frame 106 with a linkage extending therebetween. The construction of the lift assembly 146, the head-end actuator, and/or the foot-end actuator may take on any known or conventional design, and is not limited to that specifically illustrated. By way of non-limiting example, the lift assembly 146 could be arranged with the head-end and foot-end actuators between the base 104 and the support frame 106 in a column configuration to facilitate vertical movement of the patient support deck 108.

As mentioned above, the patient support apparatus 100 may comprise powered drive wheels in addition to a powered lift assembly 146. In some implementations of the patient support apparatus 100, these systems may be electrically powered and controlled using energy stored in a battery 160. The battery 160 may be supported on, or in, the support frame 106 and electrically coupled to the powered drive wheels, powered lift actuators, and a controller (not shown) to provide these and other components with electrical power. One exemplary battery 160, shown best in FIGS. 5-8, generally includes a battery housing 162 with a handle 164, one or more cells (not shown) disposed in the battery housing 162, and one or more terminals 166 in communication with the cells and supported by the battery housing 162 for engaging a corresponding receiver terminal 226 on the patient support apparatus 100, as will be discussed in further detail below. It will be appreciated that the representative versions of the battery 162 depicted throughout the drawings are shown generically (e.g., not to scale, without cells, and the like) for illustrative purposes.

The battery 160 may comprise one cell or a plurality of cells electrically coupled to one another in order to increase storage capacity or voltage of the battery 160. The battery 160 may utilize cells having a variety of compositions. For example, the cells may be Lithium-ion type, however other types of battery such Nickel-Cadmium, Nickel-metal hydride, or Lithium polymer are also contemplated. To this end, the battery 160 may be configured to provide a suitable voltage to the terminal 166 by way of different arrangement of the cells (e.g. series, parallel, series-parallel, etc). For example, the battery 160 may provide 3.7V, 5V, 6V, 12V, 18V, 36V, 40V, 60V, etc, and combinations thereof. The battery 160 may further be configured for recharging by way of a charging assembly (not shown) connected to a mains power supply or another external battery pack (not shown). The battery 160 may comprise an electrical port (not shown) in addition to the terminal 166 that allows the battery 160 to receive power from the charging assembly. While the port may assume various configurations, in one exemplary version, the electrical port comprises a USB port. In another version, the battery 160 may be configured to be wirelessly recharged via an inductive charging circuit.

The battery 160 as shown and described herein is configured to be removed from and attached to the patient support apparatus 100 by a caregiver in order to reduce weight and facilitate untethered (e.g., disconnected from mains power) operation of the patient support apparatus 100. During operation, a discharged battery may be removed by a caregiver and replaced with a charged battery. Said differently, because a discharged battery can quickly and easily be replaced with a charged battery, lower capacity and smaller volume batteries may be utilized without negatively impacting the usability of the patient support apparatus 100.

The patient support apparatus 100 includes a battery retention system 180 for retaining the battery 160 to the patient support apparatus 100 during use. In the representative version depicted in FIG. 1, the battery retention system 180 is illustrated as being operatively attached to the support frame 106 adjacent to the foot-end 116. However, it will be appreciated that other locations are contemplated. The battery retention system 180 prevents the battery 160 from unintentionally becoming disconnected from the patient support apparatus 100, which may have undesirable effects on the operation of the patient support apparatus 100.

During use, the patient support apparatus 100 may be jostled, knocked, bumped, or otherwise subjected to forces that may be transferred to the battery 160 causing an undesirable disconnection from the patient support apparatus 100. The battery retention system 180 prevents this undesirable disconnection by latching the battery 160 through the use of a latch pawl 182. In order to retract the latch pawl 182, the battery retention system 180 must be placed in an unlocked state SU, which allows the battery 160 to be removed, as will be discussed in further detail below.

Figure 2:
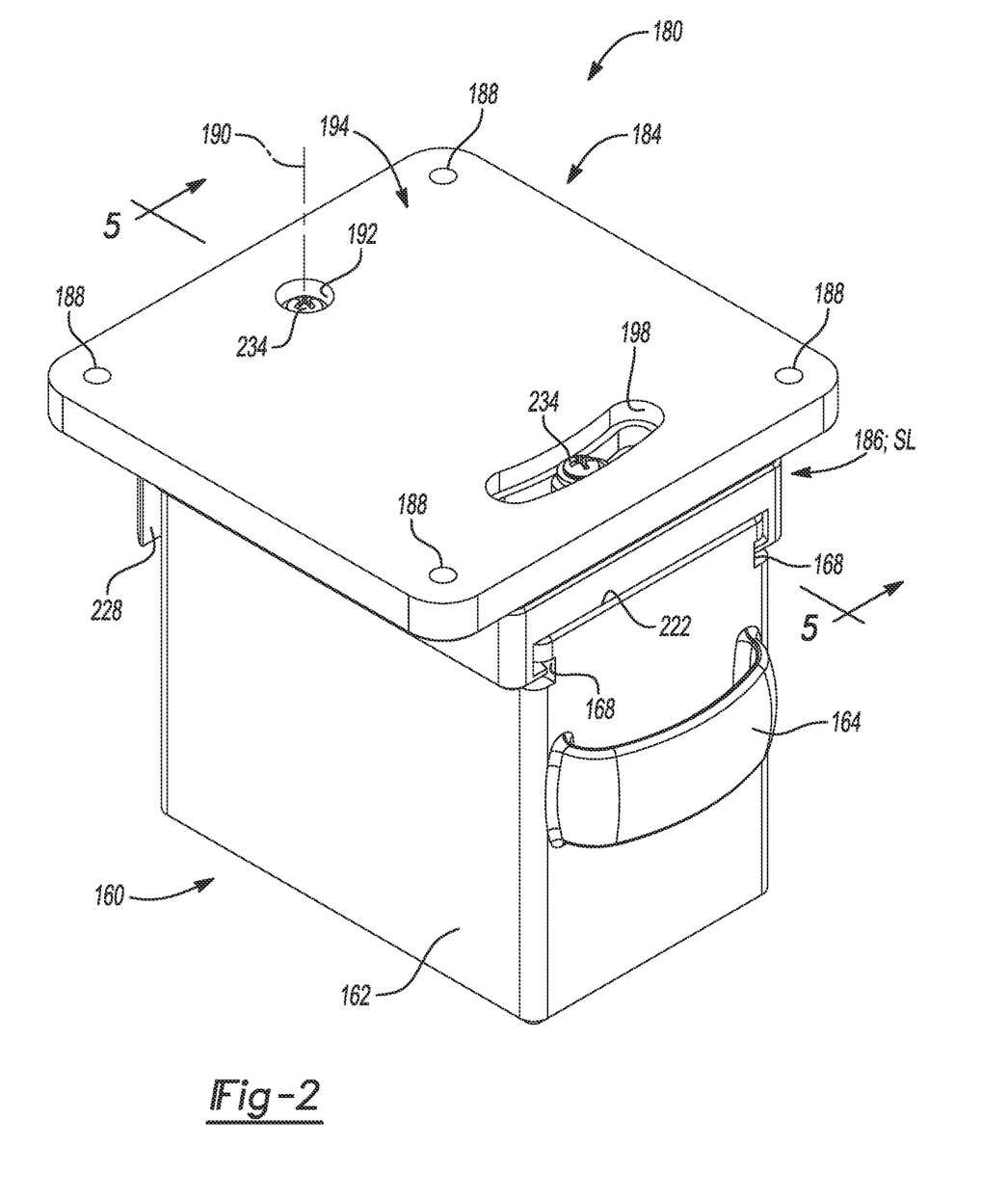
FIG. 2 is a perspective view of an exemplary battery retention system and a battery for use with a patient support apparatus.

Turning now to FIG. 2, a perspective view of an exemplary battery retention system 180 and a battery 160 are shown. The battery retention system 180 may comprise a mount base 184 and a battery receiver 186 pivotably coupled to the mount base 184 for movement between a locked state SL and an unlocked state SU. As shown here, the mount base 184 is configured to be coupled to the support frame 106, but other locations are contemplated as noted above. The mount base 184 may be coupled using fasteners (not shown) via one or more mounting holes 188 defined in the mount base 184. Alternatively, the mount base 184 may be integrally formed with the support frame 106, or a cover or housing associated with the support frame 106 or the patient support deck 108.

Figure 3:
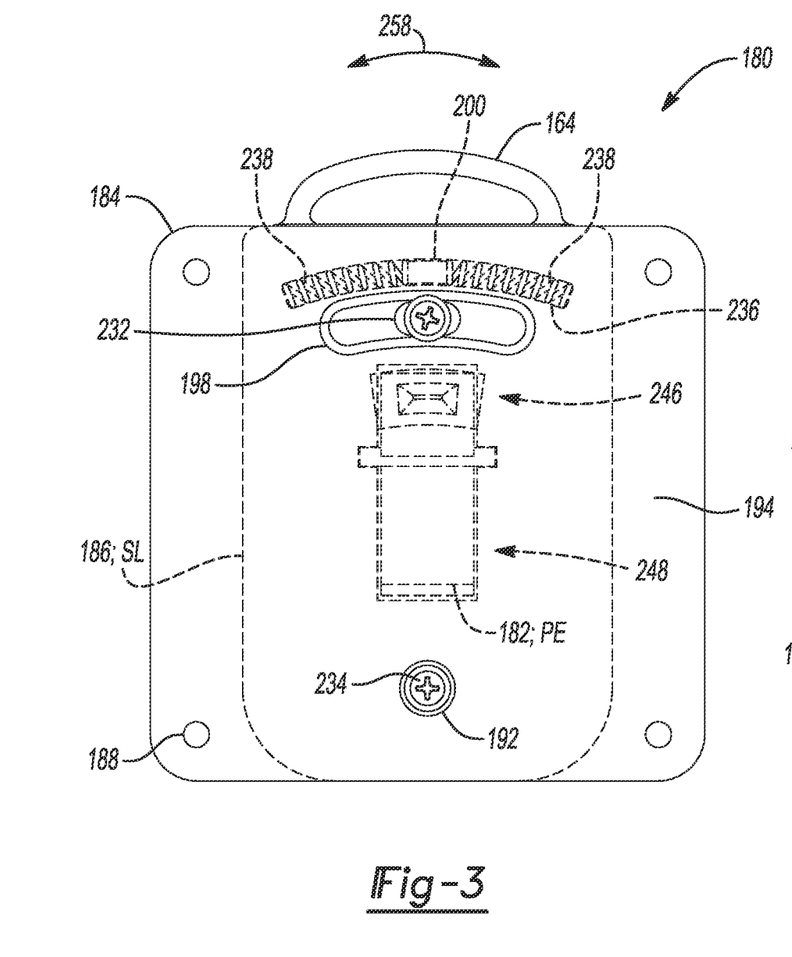
FIG. 3 is a top side view of the battery retention system and battery of FIG. 2 with a battery receiver in a locked state and latch pawl shown in phantom.

The battery receiver 186 is movable relative to the mount base 184 between the locked state SL and the unlocked state SU. The pivoting movement of the battery receiver 186 relative to the mount base 184 may occur about a pivot axis 190. In FIGS. 2 and 3, the battery receiver 186 is shown in the locked state SL, in which the battery 160 is secured to the battery retention system 180. Conversely, in FIG. 4, the battery receiver 186 is shown pivoted relative to the mount base 184 about the pivot axis 190 in the unlocked state SU, in which the battery 160 is able to be removed from the battery retention system 180 by a caregiver. In this version, the pivot axis 190 is arranged vertically such that the pivoting movement of the battery receiver 186 moves in a horizontal direction.

Referring to FIGS. 2-5, the mount base 184 may define a pivot hole 192, which may further define the pivot axis 190. The pivot hole 192 is arranged in the mount base 184 and extends between a first side 194 and a second side 196 of the mount base 184. The pivot hole 192 may be sized to receive a portion of the battery receiver 186 to facilitate the pivoting movement. The mount base 184 may further define a guide slot 198 that extends between the first side 194 and the second side 196. The guide slot 198 shown here has an arcuate shape that is curved about the pivot axis 190. As with the pivot hole 192, the guide slot 198 may be sized to receive a portion of the battery receiver 186 for constraining the pivoting movement. The mount base 184 comprises a centering peg 200 protruding from the second side 196 toward the battery receiver 186. As will be discussed in further detail below the centering peg 200 interacts with the battery receiver 186 to bias its pivoting movement.

The mount base 184 further comprises a biasing surface 202 arranged on the second side 196 and oriented toward the battery receiver 186. The biasing surface 202 may comprise one or more portions at different relative heights and angles. Here, the portions of the biasing surface 202 may take the form of discrete surfaces. For example, an intermediate surface 204 may form one discrete surface of the biasing surface 202 recessed into the second side 196 of the mount base 184 and generally parallel thereto. The biasing surface 202 may further comprise a ramp surface 206 adjacent to the intermediate surface 204 and at an angle thereto. In the implementation of the mount base 184 shown here, the biasing surface may comprise two ramp surfaces 206 arranged on opposing sides of the intermediate surface 204. As will be discussed below, the biasing surface 202 may interact with the latch pawl 182 in order to move the latch pawl 182 between an extended position PE and a retracted position PR in coordination with the pivoting movement of the battery receiver 186. Said differently, interaction between the latch pawl 182 and the biasing surface 202 may correspond to the state of the battery receiver 186, such as with the intermediate surface 204 corresponding to the locked state SL of the battery receiver 186 and the ramp surface 206 corresponding to the unlocked state SU. Other configurations are contemplated.

Figure 4:
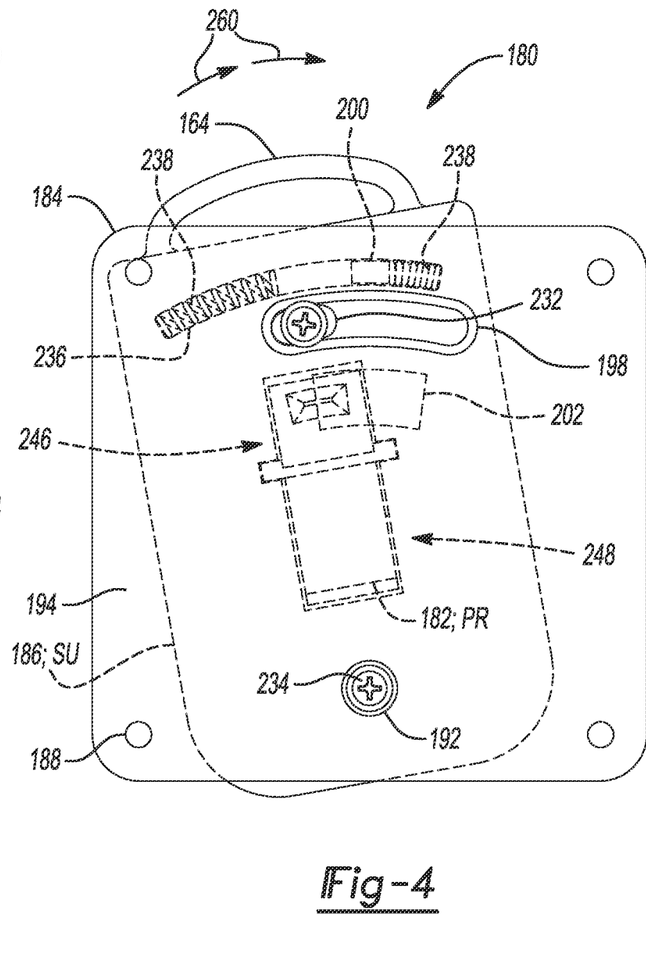
FIG. 4 is a top side view of the battery retention system and battery of FIG. 3 with the battery receiver in an unlocked state.
Figure 5:
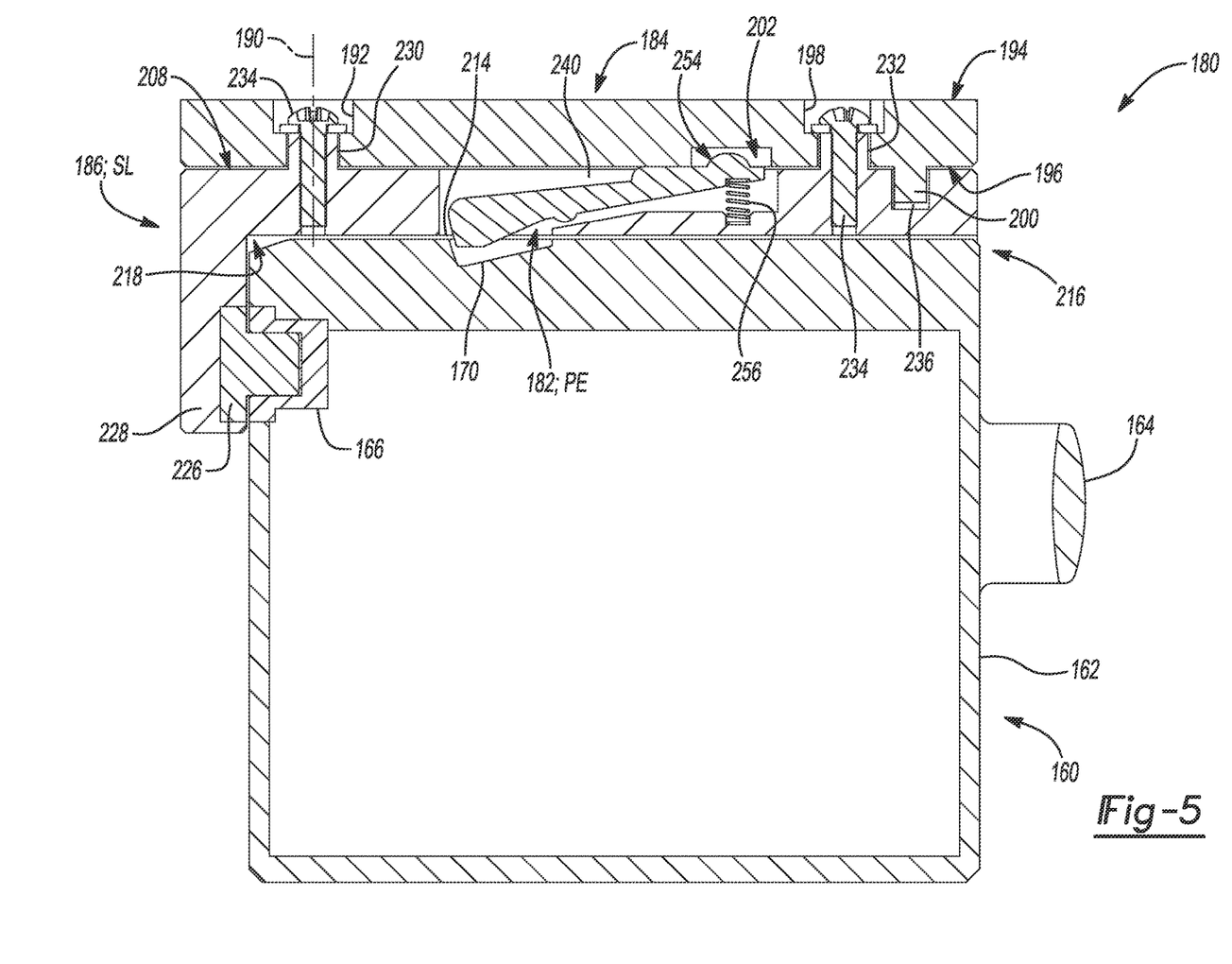
FIG. 5 is a cross-sectional side view of the battery retention system and battery of FIG. 2 showing the battery receiver and the latch pawl in an extended position.

Referring again to FIGS. 2-8, the battery receiver 186 is shown. The battery receiver 186 is pivotably coupled to the mount base 184 for movement between a locked state SL (FIG. 3) and an unlocked state SU (FIG. 4). The battery receiver 186 has a first side 208 and a second side 210. The battery receiver 186 is arranged with the first side 208 facing the mount base 184. On the second side 210, the battery receiver 186 defines a channel 212 configured for engaging the battery 160 and an aperture 214 extending between the first side 208 and the channel 212. The channel 212 extends between a first end 216 and a second end 218 in a longitudinal direction along a channel axis 220. The first end 216 has an opening 222 shaped to receive the battery 160 from the first end 216 in a direction along the channel axis 220.

Here, the battery receiver 186 comprises two rails 224 extending between the first end 216 and the second end 218 and on opposing lateral sides of the channel 212. The rails 224 engage corresponding slots 168 defined in the battery housing 162. The rails 224 are generally parallel to the channel axis 220 and support sliding engagement of the battery 160 with the battery receiver 186 along the channel axis 220. Additionally, when the battery 160 is disposed in the channel 212, the rails 224 constrain two axes of movement of the battery 160 to limit removal and replacement to one direction along the channel axis 220. As mentioned above, the battery 160 includes a terminal 166 that engages a corresponding receiver terminal 226 as the battery 160 slides along the rails 224 for enabling power transfer to the patient support apparatus 100. The receiver terminal 226 is coupled to the battery receiver 186 and arranged at the second end 218 of the channel 212. The receiver terminal 226 may be supported on an inner wall 228 of the battery receiver 186 at the second end of the channel 212.

Figure 9:
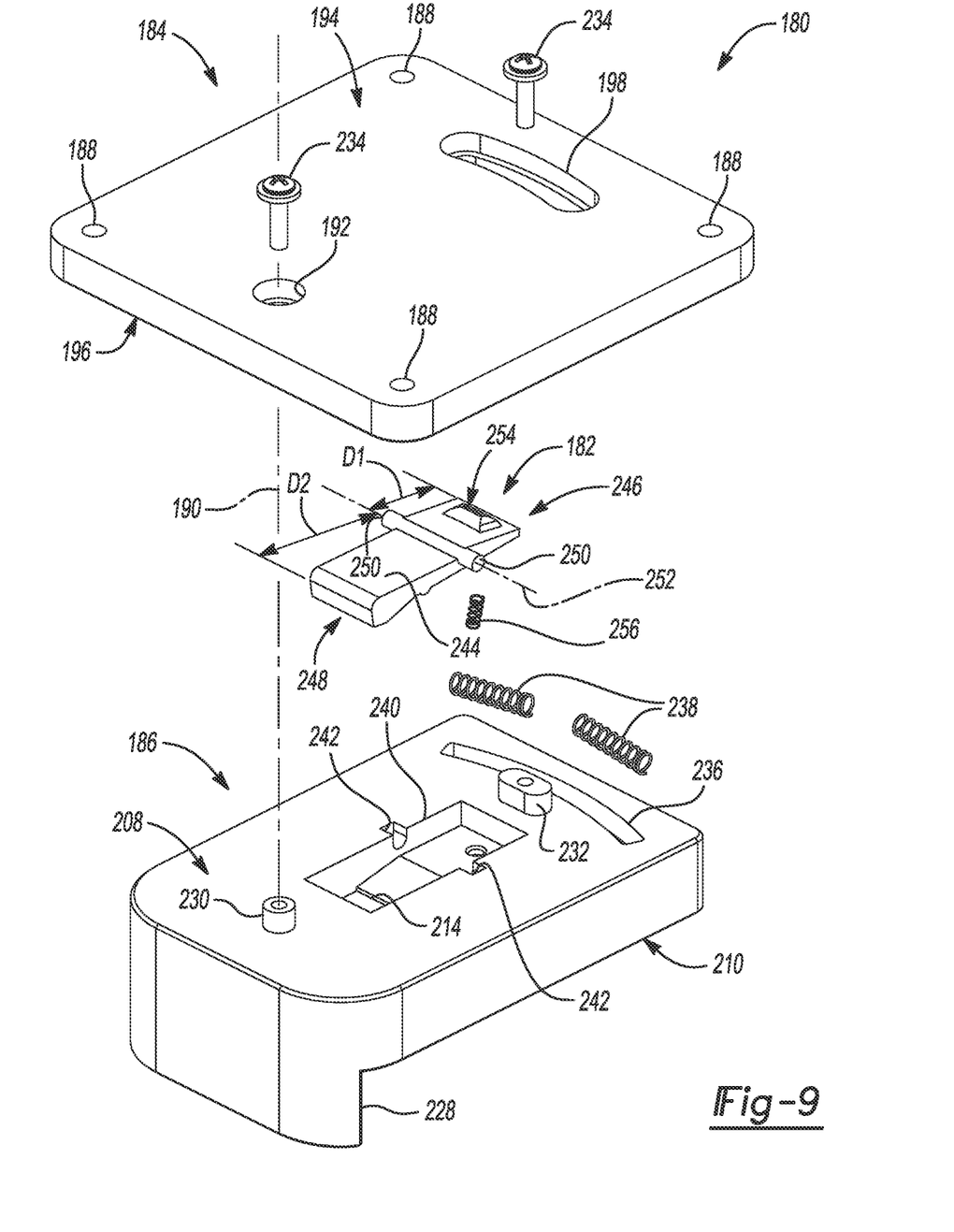
FIG. 9 is an exploded perspective view of the battery retention system of FIG. 2 showing the battery receiver and latch pawl spaced from a mount base.
Figure 10:
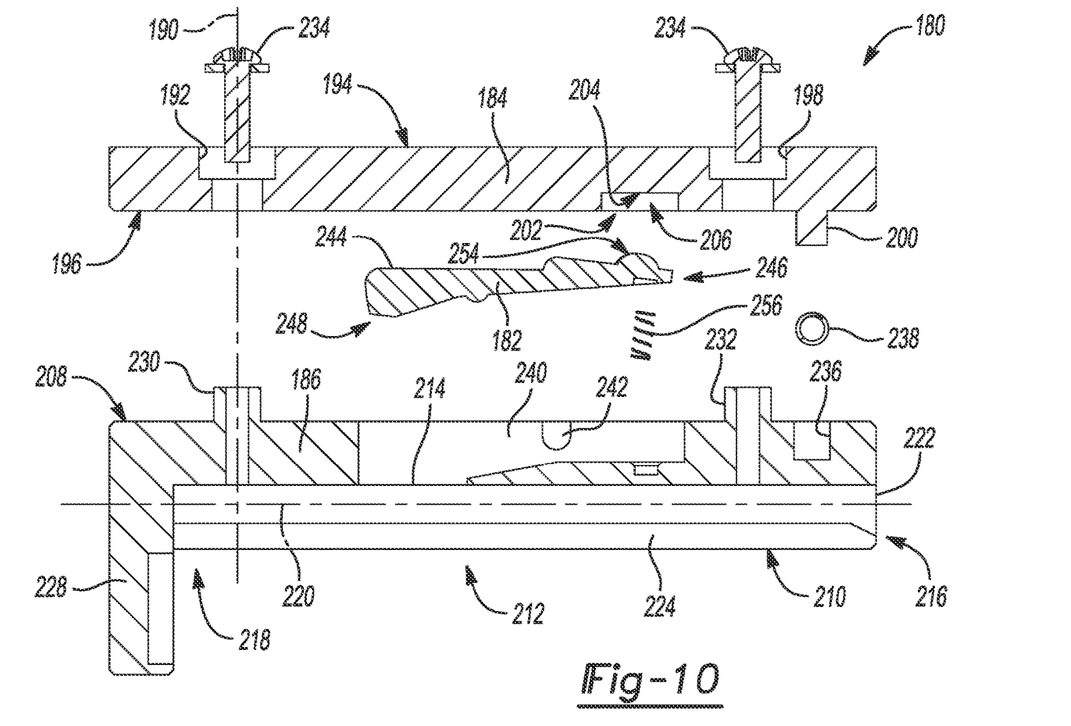
FIG. 10 is an exploded side view of the battery retention system of FIG. 9 showing the battery receiver, latch pawl, and a latch spring spaced from the mount base.

As best shown in FIG. 9, the first side 208 of the battery receiver 186 is depicted spaced from the mount base 184 and the latch pawl 182. The battery receiver 186 comprises a pivot boss 230 and a guide boss 232, which protrude from the first side 208 toward the mount base 184. The pivot boss 230 is aligned with and extends along the pivot axis 190 to engage the pivot hole 192 of the mount base 184. Similarly, the guide boss 232 is spaced from the pivot axis 190 and shaped to engage the guide slot 198. The guide boss 232 slides within the guide slot 198 as the battery receiver 186 pivots relative to the mount base 184. The pivot boss 230 and the guide boss 232 are both shaped to facilitate rotational movement about the pivot axis 190 and are arranged such that the pivot axis 190 is perpendicular to the channel axis 220. The pivot boss 230 and the guide boss 232 are further configured to receive fasteners 234 that couple the battery receiver 186 to the mount base 184.

The battery receiver 186 further defines a centering slot 236 in the first side 208. The centering slot 236 has an arcuate shape centered about the pivot axis 190 and may be arranged radially outward of the guide boss 232. The centering slot 236 is further arranged to receive the centering peg 200 of the mount base 184 such that the centering peg 200 slides within the centering slot 236 as the battery receiver 186 pivots between the locked state SL and the unlocked state SU. A return spring 238 may be disposed in the centering slot 236 between the centering peg 200 and the centering slot 236. The return spring 238 exerts a force on the mount base 184 via the centering peg and the battery receiver 186 to bias the battery receiver 186 toward the locked state SL. In this version, the battery retention system 180 comprises two return springs 238 arranged between the centering peg 200 and opposing sides of the centering slot 236. As will be described below, an arrangement of two return springs 238 may be implemented in order to bias the battery receiver 186 toward the locked state SL in both a clockwise direction and a counterclockwise direction. Alternative arrangements are contemplated.

With continued reference to FIG. 9, the battery receiver 186 further defines a latch recess 240 in the first side 208. The latch pawl 182 is disposed in the latch recess 240 between the battery receiver 186 and the mount base 184. The latch recess 240 is in communication with the aperture 214 to facilitate movement of the latch pawl 182 into the channel 212. The latch recess 240 has two pawl sockets 242 arranged on opposing sides and configured for pivotably supporting the latch pawl 182.

Figure 6:
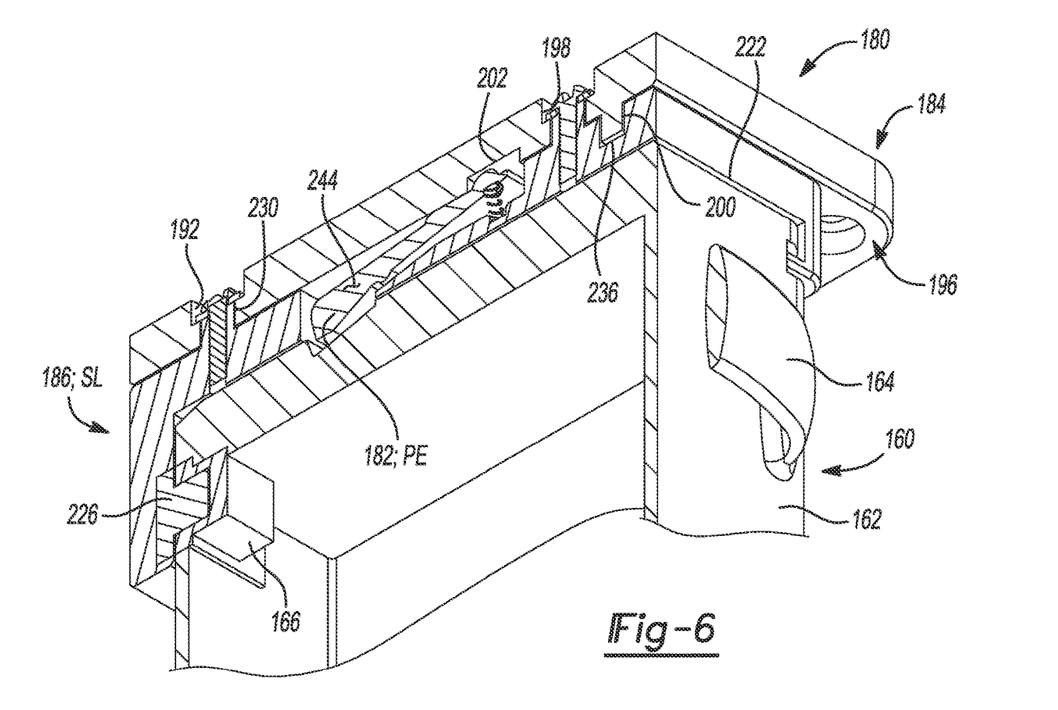
FIG. 6 is a cross-sectional perspective view of the battery retention system and battery of FIG. 2 with the battery receiver in the locked state and the latch pawl in the extended position.

As mentioned above, and shown in FIGS. 5-10, the battery retention system 180 comprises the latch pawl 182 interposed between the battery receiver 186 and the mount base 184. The latch pawl 182 is arranged for movement between a retracted position PR (FIG. 7) and an extended position PE (FIG. 6). In the retracted position PR, the latch pawl 182 is arranged substantially outside the channel 212. In the extended position PE, the latch pawl 182 is at least partially disposed in the channel 212. More specifically, the latch pawl 182 is disposed in the latch recess 240 and movable into and out of the channel 212 for selectively permitting removal of the battery 160 from the battery retention system 180. To this end, the latch pawl 182 may comprise a latch body 244 having a finger portion 246 arranged for engagement with the mount base 184 and a clasp portion 248 for engaging the battery 160.

Figure 7:
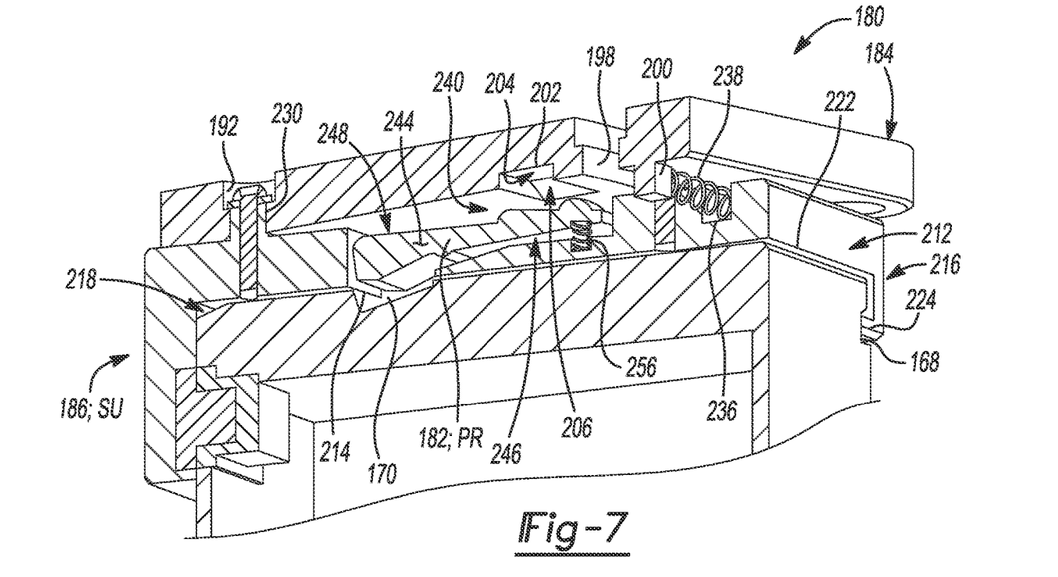
FIG. 7 is a modified cross-sectional perspective view of the battery retention system and battery of FIG. 6 with the battery receiver in the unlocked state and the latch pawl in the retracted position.
Figure 8:
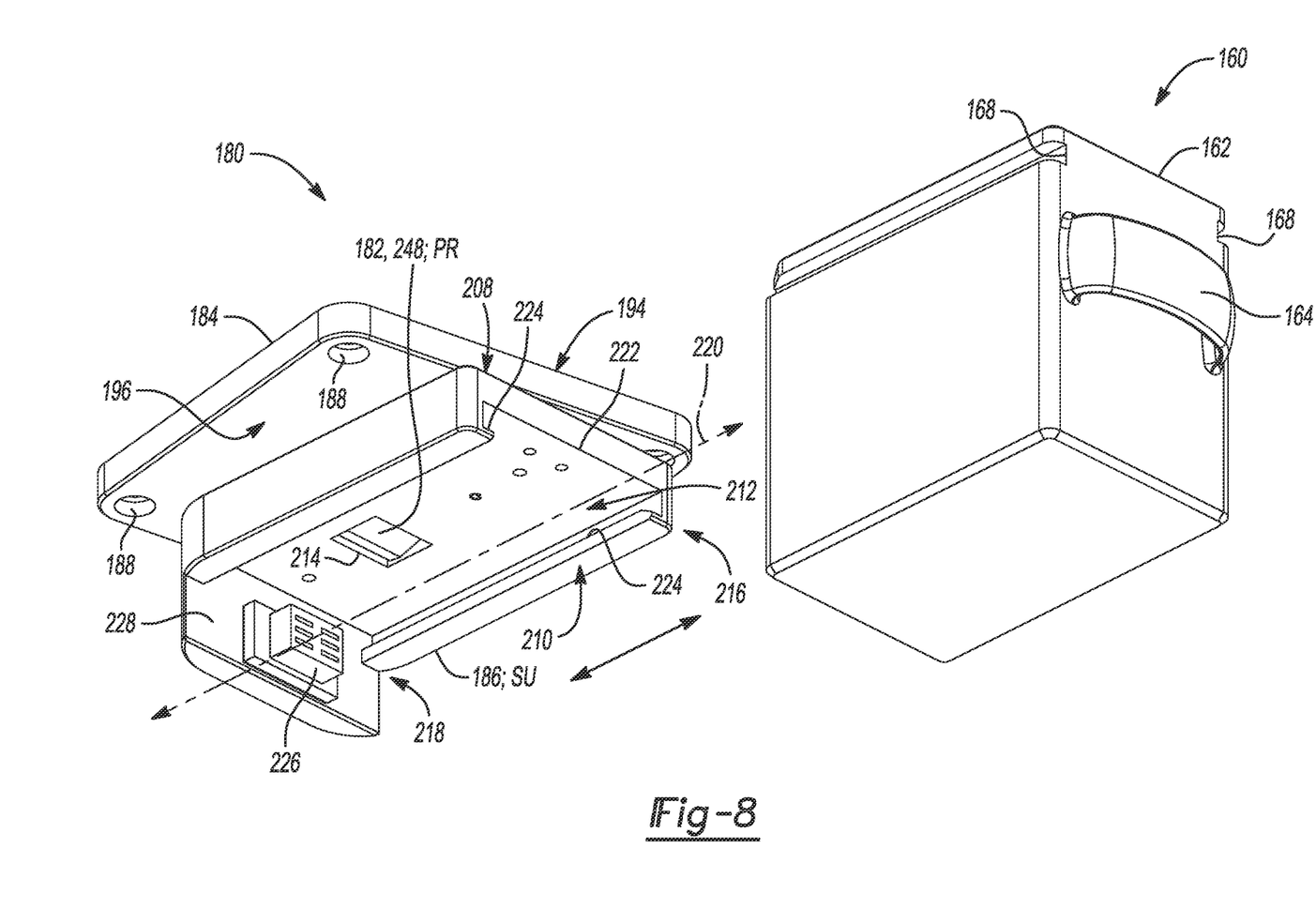
FIG. 8 is a bottom-side perspective view of the battery retention system of FIG. 6 with the battery receiver in the unlocked state, the latch pawl in the retracted position and the battery removed from the battery receiver.

The latch pawl 182 may further comprise trunnion arms 250 protruding from the latch body 244 along a latch axis 252. The latch pawl 182 is pivotable about the latch axis 252 between the extended position PE (FIGS. 5 and 6) and the retracted position PR (FIG. 7). Referring specifically to FIG. 9, where the latch pawl 182 is shown spaced from the battery receiver 186, the trunnion arms 250 are visible on opposing sides of the latch body 244. The latch axis 252 generally delineates the finger portion 246 and the clasp portion 248. It is contemplated that the latch axis 252 may not evenly divide the latch body 244 into the finger portion 246 and the clasp portion 248. In the implementation shown, the length of the finger portion 246 and the clasp portion 248 are unequal. More specifically, a distance between the latch axis 252 and an end of the finger portion 246 is less than a distance between the latch axis 252 and an end of the clasp portion 248.

As mentioned above, the latch pawl 182 is disposed in the latch recess 240 such that the trunnion arms 250 are arranged in the pawl sockets 242 for supporting pivoting movement of the latch pawl 182 about the latch axis 252. In use, as the latch pawl 182 moves from the extended position PE to the retracted position PR, the finger portion 246 moves away from the second side 196 of the mount base 184 (e.g., toward the bottom of FIG. 5), and the clasp portion 248 moves toward the second side 196 of the mount base 184 (e.g., toward the top of FIG. 5). Conversely, as the latch pawl 182 moves from the retracted position PR to the extended position PE, the finger portion 246 moves toward the second side 196 of the mount base 184 (e.g., toward the top of FIG. 5) and the clasp portion 248 moves away from the second side 196 of the mount base 184 (e.g., toward the bottom of FIG. 5).

Further referencing FIGS. 5-7 and 9, the latch pawl 182 may further comprise a follower surface 254 protruding from the finger portion 246. The follower surface 254 is arranged so as to generally protrude toward the second side 196 of the mount base 184 and is configured for engagement with the biasing surface 202. The follower surface 254 may be arranged near the end of the finger portion 246 or spaced inwardly toward the latch axis 252. A distance D1 between the follower surface 254 and the latch axis 252 may be varied to optimize the ratio between pivoting movement of the battery receiver 186 and the latch pawl 182. In the implementation shown here, the distance D1 between the latch axis 252 and the follower surface 254 is less than a distance D2 between the latch axis 252 and the end of the clasp portion 248. As will be discussed below, engagement between the follower surface 254 and the biasing surface 202 controls movement of the latch pawl 182 between the extended position PE and the retracted position PR. More specifically, as the battery receiver 186 is pivoted toward the unlocked state SU, the follower surface 254 engages the ramp surface 206, which moves the finger portion 246 toward the battery receiver 186 and pivots the latch pawl 182 toward the retracted position PR such that the clasp portion 248 is substantially outside the channel 212. As the battery receiver 186 is pivoted toward the locked state SL, the follower surface 254 may move out of engagement with the ramp surface 206, which permits the finger portion 246 to move toward the mount base 184 and to pivot the latch pawl 182 into the extended position PE with the clasp portion 248 at least partially disposed in the channel 212.

Control of the latch pawl 182 movement is facilitated by a latch spring 256 disposed between the latch pawl 182 and the battery receiver 186. The battery retention system 180 may utilize the latch spring 256 to urge the latch pawl 182 into engagement with the mount base 184. Said differently, the latch spring 256 may be arranged to bias the latch pawl 182 toward the extended position PE. As shown in the illustrated version, the latch spring 256 is disposed between the finger portion 246 of the latch body 244 and the battery receiver 186. Pivoting the battery receiver 186 toward the unlocked state SU causes the follower surface 254 to contact the ramp surface 206, which pivots the latch pawl 182. As the latch pawl 182 pivots toward the retracted position PR, the latch spring 256 is compressed. From the unlocked state SU, pivoting the battery receiver 186 toward the locked state SL allows the follower surface 254 to disengage from the ramp surface 206 and the latch spring 256 to pivot the latch pawl 182 toward the extended position PE. In some implementations, engagement between the follower surface 254 and the intermediate surface 204 may correspond to the extended position PE of the latch pawl 182. In other implementations, the intermediate surface 204 may be sufficiently recessed in the mount base 184 (e.g., spaced from the second side 196) such that the finger portion 246 of the latch pawl 182 contacts the mount base 184 without the follower surface 254 engaging the intermediate surface 204. Other configurations are contemplated.

With renewed reference to FIGS. 3 and 4, the battery retention system 180 is shown in operation to remove the battery 160. In FIG. 3, the battery receiver 186 is shown in the locked state SL in which the battery 160 is secured in the channel 212 preventing unintended removal. In FIG. 4, the battery receiver 186 is pivoted (by a user, not shown) into the unlocked state SU in which the battery 160 is able to be removed from the channel 212. When the battery receiver 186 is in the unlocked state SU, the return spring 238 is compressed by the centering peg 200 in the centering slot 236. Compression of the return spring 238 biases the battery receiver 186 back to the locked state SL when a user releases the battery receiver 186. Here, the user has pivoted the battery receiver 186 in an anti-clockwise direction, which compresses the return spring 238 opposite the pivoting direction (e.g., on the right side of FIG. 4). From the locked state SL, the user may alternatively pivot the battery receiver 186 in a clockwise direction in order to move the battery receiver 186 into the unlocked state SU. Said differently, the battery receiver 186 is configured such that the user may move the battery receiver 186 into the unlocked state SU by pivoting in the clockwise direction and the anti-clockwise direction, as shown by the arrows 258 in FIG. 3.

The guide boss 232 moves between opposing ends of the guide slot 198 to constrain the movement of the battery receiver 186. The unlocked state SU generally corresponds to the guide boss 232 adjacent to or engaging one of the opposing ends of the guide slot 198. The locked state SL generally corresponds to the guide boss 232 being positioned near a midpoint of the guide slot 198. As such, when the battery receiver 186 is pivoted anti-clockwise by the user into the unlocked state SU as shown in FIG. 4, the battery receiver 186 is capable of two clockwise pivoting movements, illustrated by the arrows 260 in FIG. 4. Said differently, from a first unlocked state SU, the battery receiver 186 may be pivoted in the opposite direction, through the locked state SL, and into a second unlocked state SU. In the second unlocked state SU, the opposite return spring 238 is compressed. In other words, each return spring 238 returns the battery receiver 186 to the locked state SL from one of the unlocked state SUs.

As mentioned above, the battery retention system 180 may be used to facilitate removing and replacing a discharged battery from the patient support apparatus 100. To remove the battery 160, the caregiver or other user may grasp the handle 164 (or another part of the battery 160) and pivot the battery 160 and battery receiver 186 in either direction indicated by the arrow 258 in FIG. 3. Pivoting the battery receiver 186 moves the latch pawl 182 such that the follower surface 254 engages one of the ramp surfaces 206. As the battery receiver 186 continues to pivot, the latch pawl 182 pivots about the latch axis 252 with the finger portion 246 compressing the latch spring 256 and the clasp portion 248 moving out of the battery notch 170. When the clasp portion 248 is sufficiently outside the channel 212 the battery 160 may be slid along the rails 224 and removed from the battery receiver 186. When the user releases the battery receiver 186 and removes the battery 160, the battery receiver 186 is moved by the return spring 238 into the locked state SL and the latch pawl 182 pivots back to the extended position PE.

The battery 160 may be reinstalled by first aligning the slots 168 with the rails 224 of the channel 212 and sliding the battery 160 through the opening 222. As the battery 160 approaches the aperture 214, the battery housing 162 engages the clasp portion 248 of the latch pawl 182. Sliding the battery 160 further along the channel axis 220 urges the clasp portion 248 out of the channel 212. When the battery 160 is fully inserted in the channel 212 such that the battery terminal 166 and the receiver terminal 226 are electrically engaged, the latch pawl 182 is able to pivot into the extended position PE with the clasp portion 248 in the notch 170 of the battery 160. Interaction between the clasp portion 248 and the notch 170 prevents the battery 160 from being removed from the battery retention system 180.

Some instances of the battery retention system 180 may be implemented and utilized to not only prevent unintended removal of the battery 160, but also for asset protection. Because the battery 160 is prevented from being removed from the patient support apparatus 100, the battery retention system 180 may be configured to prevent an unauthorized user from removing the battery 160 (e.g., theft). If the battery receiver 186 is prevented from being pivoted out of the locked state SL and into the unlocked state SU, a user would be unable to remove the battery 160. The battery receiver 186 may be secured in the locked state SL using, for example, a locking pin (not shown) movable with a physical security device, such as a key. Other physical security devices may be implemented in the alternative. For example, the physical security device may be a combination lock, a hidden lever, a magnetic toggle, and the like. In some versions, the locking pin may be controlled by an electronic solenoid, which may move the locking pin into and out of engagement with the battery receiver 186 and the mount base 184 to prevent relative movement therebetween. The implementation of an electronically controlled locking pin may be further combined with a security device other than the physical key. For example, a numeric keypad may be coupled to the patient support apparatus 100 which requires a code to be correctly entered in order to release the locking pin. The electronic solenoid may be in communication with a controller integrated into the patient support apparatus and used for controlling other functions (e.g. the lift assembly 146) such that a particular combination of actions using the buttons on the user input handles 152 may enable a battery removal mode. Other methods such as an electronic key (e.g. RFID, NFC, Bluetooth) may be used to authenticate a user to enable the battery removal mode are contemplated. Further still, the patient support apparatus 100 may utilize a biometric authentication sub-system comprising a non-transitory computer-readable medium having an authorized user's biometric information stored thereon (e.g. fingerprint, facial scan, voice characteristics, retina scan, etc.). The biometric authentication sub-system may be implemented in a mobile device (e.g. a smart phone), or integrated with the patient support apparatus 100 and coupled thereto. For example, a fingerprint reader may be coupled to the user input handles 152 and configured to send an unlock single to the electronic solenoid when an authorized user has placed their finger on the fingerprint reader. Other implementations are contemplated.

It is further contemplated that in addition, or in the alternative, to the locking pin, an electronic solenoid may be operably coupled to the latch pawl 182 for direct control. In this implementation the requirement for an authorized user to first pivot the battery receiver 186 into the unlocked state SU may be eliminated. Said differently, the electronic solenoid may directly control movement of the latch pawl 182 between the extended position PE and the retracted position PR. Once a user has enabled the battery removal mode the step of first pivoting the battery receiver 186 may be skipped.

Turning now to FIGS. 11-15, another version of a battery retention system is shown. As will be appreciated from the subsequent description below, the second battery retention system is similar to the battery retention system 180 described above in connection with FIGS. 1-10. As such, the components and structural features of the second version of the battery retention system 180' that are the same as, or that otherwise correspond to, the first version of the battery retention system 180 are provided with the same reference numerals with the addition of a prime symbol (e.g. 180 and 180'). While the specific differences between these versions will be described in detail, for the purposes of clarity, consistency, and brevity, only certain structural features and components common between these versions will be discussed and depicted in the drawings of the second version of the battery retention system 180'. Here, unless otherwise indicated, the above description of the first version of the battery retention system 180 may be incorporated by reference with respect to the second version of the battery retention system 180' without limitation.

Figure 11:
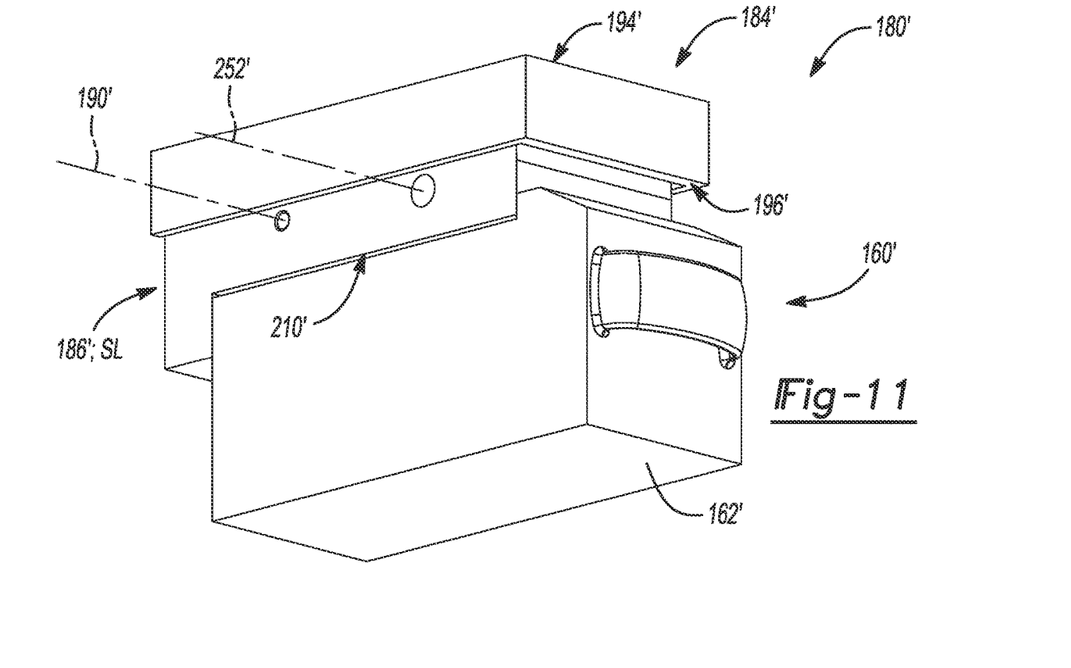
FIG. 11 is a bottom side perspective view of another battery retention system and battery for use with a patient support apparatus.

Similar to above, the battery retention system 180' shown in FIG. 11 prevents the battery 160' from unintentionally becoming disconnected from the patient support apparatus 100, which may have undesirable effects on the operation of the patient support apparatus 100. The battery retention system 180' may comprise a mount base 184' and a battery receiver 186' pivotably coupled to the mount base 184' for movement between a locked state SL and an unlocked state SU. The mount base 184' is configured to be coupled to the support frame 106.

Figure 12:
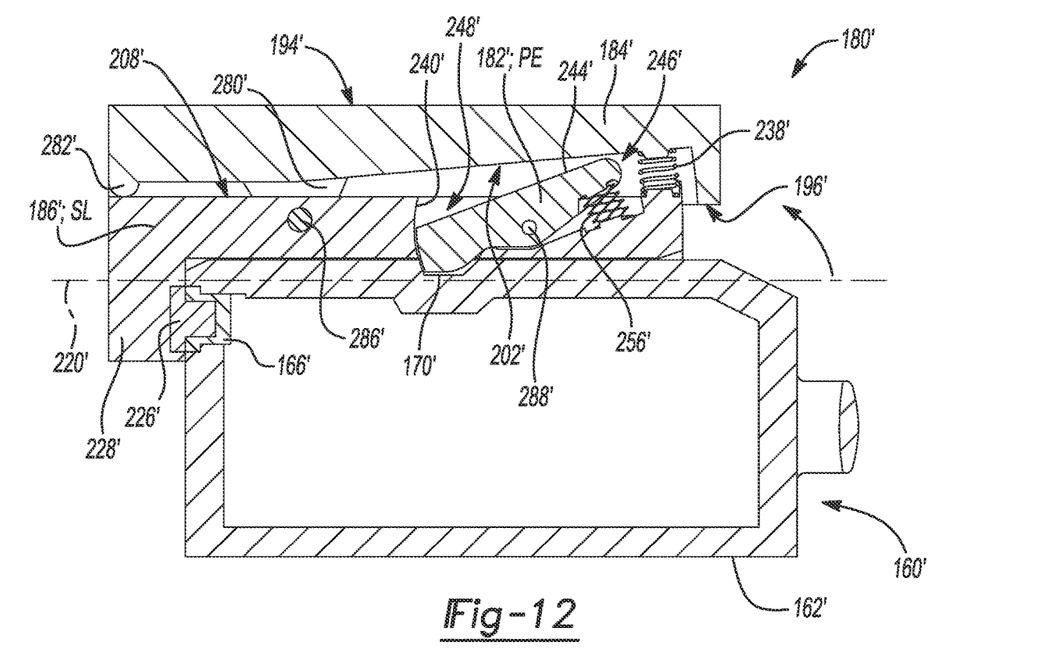
FIG. 12 is a cross-sectional side view of the battery retention system and battery of FIG. 10 showing a battery receiver in a locked state and a latch pawl in an extended position.

The battery receiver 186' is movable relative to the mount base 184' between the locked state SL and the unlocked state SU. The pivoting movement of the battery receiver 186' relative to the mount base 184' may occur about a pivot axis 190'. In FIG. 12, the battery receiver 186' is shown in the locked state SL, in which the battery 160' is secured to the battery retention system 180'. Conversely, in FIGS. 13 and 14, the battery receiver 186' is shown pivoted relative to the mount base 184' about the pivot axis 190' in the unlocked state SU, in which the battery 160' is able to be removed from the battery retention system 180' by a caregiver. In this version, the pivot axis 190' is arranged horizontally such that the pivoting movement of the battery receiver 186' moves in a vertical direction.

Referring to FIGS. 12-15, the mount base 184' comprises first side 194', a second side 196', and a pair of pivot ears 280', which define a pivot hole 192'. The pivot ears 280' protrude from the second side 196' of the mount base 184' toward the battery receiver 186'. Each of the pivot holes 192' extends though the respective pivot ears 280' along a pivot axis 190'. The mount base 184' may further comprise a biasing surface 202' arranged on the second side 196' and oriented toward the battery receiver 186' for engaging the latch pawl 182'. The mount base 184' may further comprise a pivot limiter 282' protruding from the second side 196'. The pivot limiter 282' is arranged for contact with the battery receiver 186' to define the locked state SL. As will be discussed below, the biasing surface 202' may interact with the latch pawl 182' in order to move the latch pawl 182' between the extended and retracted position PRs in coordination with the pivoting movement of the battery receiver 186'.

The battery receiver 186' is pivotably coupled to the mount base 184' for movement between a locked state SL and an unlocked state SU. The battery receiver 186' has a first side 208' oriented toward the mount base 184' and a second side 210'. On the second side 210' the battery receiver 186' defines a channel 212' configured for engaging the battery 160' and an aperture 214' extending between the first side 208' and the channel 212'. The channel 212' extends between a first end 216' and a second end 218' in a longitudinal direction along a channel axis 220'. The first end 216' has an opening 222' shaped to receive the battery 160' from the first end 220' in a direction along the channel axis 220'.

Here too, the battery receiver 186' comprises two rails 224' extending between the first end 216' and the second end 218' and on opposing lateral sides of the channel 212'. The rails 224 engage corresponding slots defined in the battery housing 162'. The rails 224' are generally parallel to the channel axis 220' and support sliding engagement of the battery 160' with the battery receiver 186' along the channel axis 220'. As mentioned above, the battery 160' includes a terminal 166' that engages a corresponding receiver terminal 226' as the battery 160' slides along the rails 224' for enabling power transfer to the patient support apparatus 100. The receiver terminal 226' is coupled to the battery receiver 186' and arranged at the second end 218' of the channel 212'. The receiver terminal 226' may supported on an inner wall 228' of the battery receiver 186' at the second end of the channel 212'.

Figure 15:
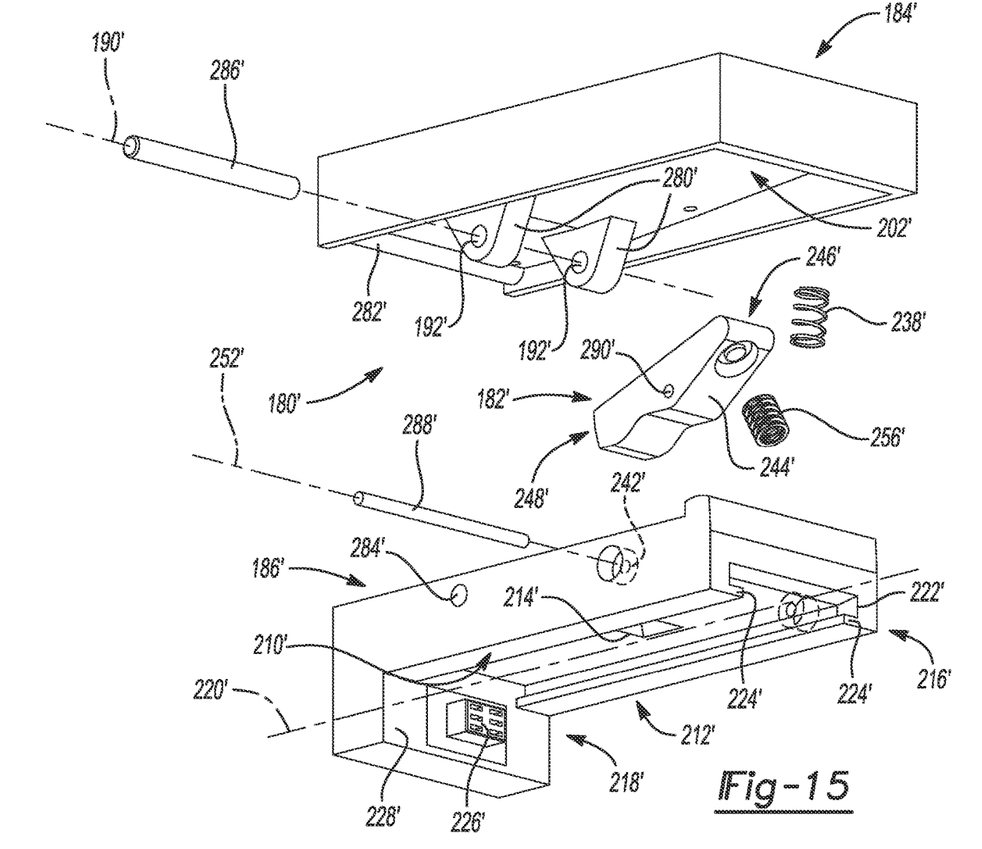
FIG. 15 is an exploded perspective view of the battery retention system of FIG. 14 showing the battery receiver, latch pawl, and a latch spring spaced from a mount base.

As best shown in FIG. 15, the second side 210' of the battery receiver 186' is depicted spaced from the mount base 184' and the latch pawl 182'. The battery receiver 186' defines a pivot bore 284' extending therethrough in a lateral direction perpendicular to the channel axis 220'. When assembled, the pivot bore 284' is aligned with the pivot axis 190' and facilitates the pivoting movement of the battery receiver 186'. To this end, the battery retention system 180' further comprises a pivot rod 286'. The pivot rod 286' is shown spaced from the pivot holes 192' and aligned with the pivot axis 190'. When assembled, the pivot rod 286' is received in the pivot holes 192' and the pivot bores 286' to facilitate the pivoting movement of the battery receiver 186'.

With continued reference to FIGS. 12-15, the battery receiver 186' further defines a latch recess 240' in the first side 208'. The latch pawl 182' is disposed in the latch recess 240' between the battery receiver 186' and the mount base 184'. The latch recess 240' is in communication with the aperture 214' to facilitate movement of the latch pawl 182' into the channel 212'. The battery receiver 186' defines two pawl sockets 242' on opposing sides of the latch recess 240' and extending through the battery receiver 186'. The pawl sockets 242' are configured to receive a trunnion rod 288', which pivotably supports the latch pawl 182'.

The battery retention system 180' may further comprise a return spring 238' disposed between the mount base 184' and the battery receiver 186'. The return spring 238' exerts a force on the mount base 184' and the battery receiver 186' to bias the battery receiver 186' toward the locked state SL.

The battery retention system 180' comprises the latch pawl 182' interposed between the battery receiver 186' and the mount base 184'. The latch pawl 182' is arranged for movement between a retracted position PR (FIG. 13) and an extended position PE (FIG. 12). In the retracted position PR the latch pawl 182' is substantially outside the channel 212'. In the extended position PE the latch pawl 182' is at least partially disposed in the channel 212'. More specifically, the latch pawl 182' is disposed in the latch recess 240' and movable into and out of the channel 212' for selectively permitting removal of the battery 160' from the battery retention system 180'. To this end, the latch pawl 182' may comprise a latch body 244' having a finger portion 246' arranged for engagement with the mount base 184' and a clasp portion 248' for engaging the battery 160'. The latch body 244' may define a trunnion bore 290' extending therethrough along a latch axis 252'. The trunnion bore 290' receives the trunnion rod 288' to facilitate the pivoting movement of the latch pawl 182'.

The latch pawl 182' is disposed in the latch recess 240' such that the trunnion rod 288' is arranged in the pawl sockets 242' and the trunnion bore 290' for supporting pivoting movement of the latch pawl 182' about the latch axis 252'. In use, as the latch pawl 182' moves from the extended position PE to the retracted position PR, the finger portion 246' engages the mount base 184' and the clasp portion 248' gets closer to the second side 196' of the mount base 184'. Conversely, as the latch pawl 182' moves from the retracted position PR to the extended position PE, the clasp portion 248' gets further away from the second side 196' of the mount base 184'.

Control of the latch pawl 182' movement is facilitated by a latch spring 256' disposed between the latch pawl 182' and the battery receiver 186'. The battery retention system 180' may utilize the latch spring 256' to urge the latch pawl 182' into engagement with the mount base 184'. Said differently, the latch spring 256' may be arranged to bias the latch pawl 182' toward the extended position PE. As shown here, the latch spring 256' is disposed between the finger portion 246' of the latch body 244' and the battery receiver 186'. Pivoting the battery receiver 186' toward the unlocked state SU causes the finger portion 246' to contact the biasing surface 202', which pivots the latch pawl 182' relative to the battery receiver 186'. As the latch pawl 182' pivots toward the retracted position PR the latch spring 256' is compressed. From the unlocked state SU, pivoting the battery receiver 186' toward the locked state SL allows the latch spring 256' to pivot the latch pawl 182' back toward the extended position PE.

Figure 13:
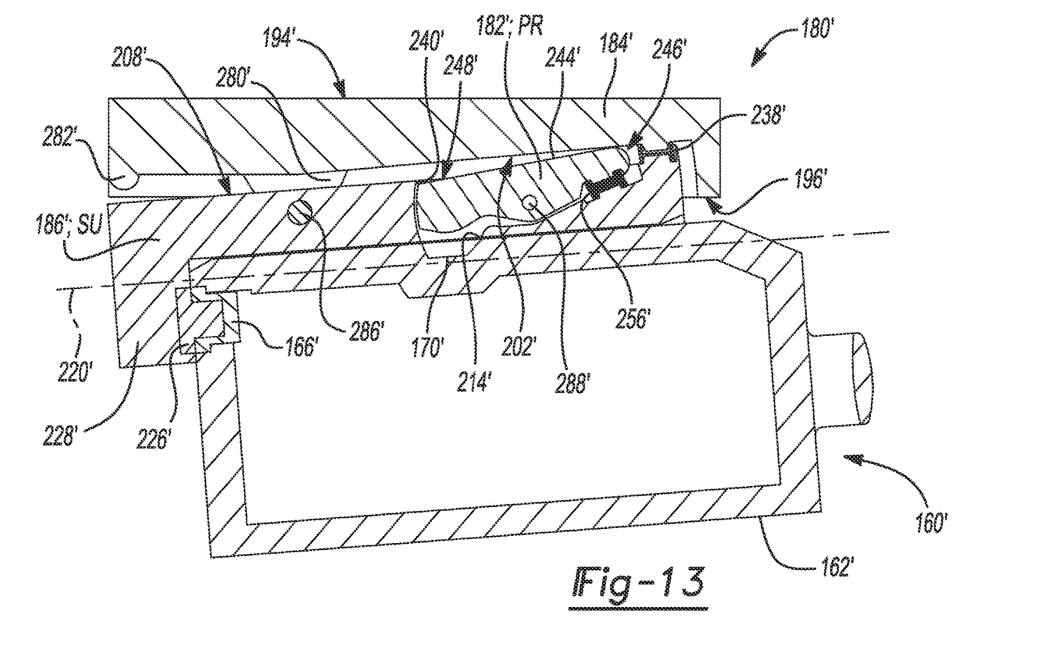
FIG. 13 is a cross-sectional side view of the battery retention system and battery of FIG. 12 showing the battery receiver in an unlocked state and a latch pawl in a retracted position.
Figure 14:
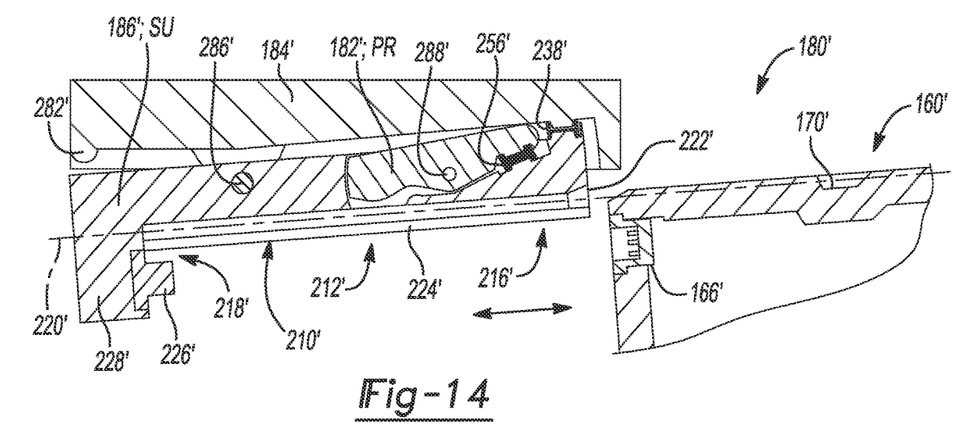
FIG. 14 is a cross-sectional side view of the battery retention system of FIG. 12 showing the battery receiver in an unlocked state and a latch pawl in a retracted position with the battery removed from the battery receiver.

With renewed reference to FIGS. 12-14, the battery retention system 180' is shown in operation to remove the battery 160'. In FIG. 12, the battery receiver 186' is shown in the locked state SL in which the battery 160' is secured in the channel 212' preventing unintended removal. In FIG. 13, the battery receiver 186' is pivoted (by a user, not shown) into the unlocked state SU in which the battery 160' is able to be removed from the channel 212'. When the battery receiver 186' is in the unlocked state SU the return spring 238' is compressed, which biases the battery receiver 186' back toward the locked state SL when a user releases the battery receiver 186'.

Similar to above, the battery 160' may be reinstalled by first aligning the battery 160' with the rails 224' of the channel 212' and sliding the battery 160' through the opening 222'. As the battery 160' approaches the aperture 214', the battery housing 162' engages the clasp portion 248' of the latch pawl 182'. Sliding the battery 160' further along the channel axis 220' urges the clasp portion 248' out of the channel 212'. When the battery 160' is fully inserted in the channel 212' such that the battery terminal 166' and the receiver terminal 226' are electrically engaged, the latch pawl 182' is able to pivot into the extended position PE with the clasp portion 248' in the notch 170' of the battery 160'. Interaction between the clasp portion 248' and the notch 170' prevents the battery 160' from being removed from the battery retention system 180.

Several examples have been discussed in the foregoing description. However, the examples discussed herein are not intended to be exhaustive or limit the disclosure to any particular form. Various modifications to these aspects will be readily apparent to those skilled in the art, and the generic principles defined herein may be applied to other aspects without departing from the scope of the disclosure. The terminology that has been used is intended to be in the nature of words of description rather than of limitation. Many modifications and variations are possible in light of the above teachings and the disclosure may be practiced otherwise than as specifically described.

What is claimed is:

1. A patient support apparatus having a removable battery, the patient support apparatus comprising:
    a support frame with a patient support deck disposed on the support frame; and
    a battery retention system coupled to the support frame and including:
        a mount base,
        a battery receiver pivotably coupled to the mount base for movement between a locked state and an unlocked state, the battery receiver defining a channel configured for engaging the battery and an aperture in communication with the channel,
        an electrical interface coupled to the battery receiver for engaging the battery, and
        a latch pawl interposed between the battery receiver and the mount base adjacent to the aperture, the latch pawl being arranged for movement between:
            a retracted position in which the latch pawl is substantially outside the channel; and
            an extended position in which the latch pawl is at least partially disposed in the channel;
        wherein the latch pawl is engaged with the mount base such that pivoting movement of the battery receiver from the locked state to the unlocked state moves the latch pawl from the extended position toward the retracted position for permitting removal of the battery from the battery retention system.

2. The patient support apparatus of claim 1, further including a return spring arranged between the mount base and the battery receiver to bias the battery receiver toward the locked state.

3. The patient support apparatus of claim 2, wherein the return spring is further defined as a first return spring arranged to bias the battery receiver in a first direction; and
    further including a second return spring arranged to bias the battery receiver in a second direction.

4. The patient support apparatus of claim 1, wherein the channel extends between a first end having an opening shaped to receive the battery, and a second end; and
    wherein pivoting movement of the battery receiver occurs about a pivot axis arranged closer to the second end than to the first end.

5. The patient support apparatus of claim 1, wherein the channel extends along a channel axis between a first end having an opening shaped to receive the battery, and a second end; and
    wherein the channel is shaped for receiving the battery from the first end.

6. The patient support apparatus of claim 5, wherein the latch pawl includes a latch body having a finger portion arranged for engagement with the mount base, and a clasp portion for engaging the battery; and
    wherein the finger portion is arranged nearer to the first end of the channel than the second end.

7. The patient support apparatus of claim 5, wherein the pivoting movement of the battery receiver relative to the mount base occurs about a pivot axis; and
    wherein the pivot axis is perpendicular to the channel axis.

8. The patient support apparatus of claim 5, wherein the electrical interface is arranged at the second end of the channel.

9. The patient support apparatus of claim 1, wherein the mount base includes a biasing surface having a first surface and a ramp surface adjacent to the first surface; and wherein the ramp surface is angled relative to the first surface.

10. The patient support apparatus of claim 9, wherein the latch pawl includes a follower surface engageable with the biasing surface; and wherein engagement between the follower surface and the ramp surface moves the latch pawl towards the retracted position.

11. The patient support apparatus of claim 9, wherein the ramp surface is further defined as two ramp surfaces arranged on opposing sides of the first surface.

12. The patient support apparatus of claim 1, wherein the latch pawl includes a latch body with at least one trunnion arm protruding from the latch body along a latch axis; and wherein the latch pawl is pivotable about the latch axis between the extended position and the retracted position.

13. The patient support apparatus of claim 12, wherein the latch pawl includes a follower surface protruding from the latch body for engaging the mount base.

14. The patient support apparatus of claim 12, wherein the latch body has a finger portion with a follower surface protruding therefrom; and wherein the latch body has a clasp portion arranged for engaging the battery in the extended position.

15. The patient support apparatus of claim 14, wherein a distance between the latch axis and the follower surface is less than a distance between the latch axis and an end of the clasp portion.

16. The patient support apparatus of claim 14, wherein the battery retention system further includes a latch spring arranged to bias the latch pawl toward the extended position.

17. The patient support apparatus of claim 16, wherein the latch spring is disposed between the finger portion of the latch pawl and the battery receiver.

18. The patient support apparatus of claim 1, wherein the pivoting movement of the battery receiver occurs about a pivot axis arranged vertically such that movement between the locked state and the unlocked state occurs in a horizontal direction.

19. The patient support apparatus of claim 1, wherein the pivoting movement of the battery receiver occurs about a pivot axis arranged horizontally such that movement between the locked state and the unlocked state occurs in a vertical direction.

20. A patient support apparatus comprising:

a support frame with a patient support deck disposed on the support frame;

a lift assembly having a powered lift actuator to adjust the support frame;

a battery configured for providing power to the lift assembly; and a battery retention system coupled to the support frame and including:

a mount base, a battery receiver pivotably coupled to the mount base for movement between a locked state and an unlocked state, the battery receiver defining a channel configured for engaging the battery and an aperture in communication with the channel, an electrical interface coupled to the battery receiver for engaging the battery, and a latch pawl interposed between the battery receiver and the mount base adjacent to the aperture, the latch pawl being arranged for movement between:

a retracted position in which the latch pawl is substantially outside the channel; and an extended position in which the latch pawl is at least partially disposed in the channel;

wherein the latch pawl is engaged with the mount base such that pivoting movement of the battery receiver from the locked state to the unlocked state moves the latch pawl from the extended position toward the retracted position for permitting removal of the battery from the battery retention system.

* * * * *